(12) United States Patent
Bao et al.

(10) Patent No.: US 11,702,339 B2
(45) Date of Patent: Jul. 18, 2023

(54) POLYARYLONITRILE SYSTEM FOR PREPARING MULTIFUNCTIONAL CARBON FLOWERS AND OTHER SUPERSTRUCTURES

(71) Applicant: The Board of Trustees of the Leland Stanford Junior University, Stanford, CA (US)

(72) Inventors: Zhenan Bao, Stanford, CA (US); Shucheng Chen, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 66 days.

(21) Appl. No.: 17/257,727

(22) PCT Filed: Jul. 15, 2019

(86) PCT No.: PCT/US2019/041838
§ 371 (c)(1),
(2) Date: Jan. 4, 2021

(87) PCT Pub. No.: WO2020/018438
PCT Pub. Date: Jan. 23, 2020

(65) Prior Publication Data
US 2021/0284537 A1   Sep. 16, 2021

Related U.S. Application Data
(60) Provisional application No. 62/701,051, filed on Jul. 20, 2018.

(51) Int. Cl.
*C01B 32/15* (2017.01)
*B82Y 40/00* (2011.01)

(52) U.S. Cl.
CPC .............. *C01B 32/15* (2017.08); *B82Y 40/00* (2013.01); *C01P 2002/01* (2013.01);
(Continued)

(58) Field of Classification Search
CPC ..... C01B 32/15; B82Y 40/00; C01P 2002/01; C01P 2002/85; C01P 2004/03; C01P 2004/04; C01P 2006/12; C01P 2006/16
See application file for complete search history.

(56) References Cited

U.S. PATENT DOCUMENTS

| | | | |
|---|---|---|---|
| 2003/0185741 A1* | 10/2003 | Matyjaszewski ...... | B82Y 15/00 526/341 |
| 2008/0118427 A1* | 5/2008 | Leon y Leon .......... | D02J 1/228 423/447.2 |

(Continued)

FOREIGN PATENT DOCUMENTS

| | | | |
|---|---|---|---|
| CN | 101219784 | 7/2008 | |
| KR | 10-2011-0125957 | * 11/2011 | ............ C08F 220/44 |

(Continued)

OTHER PUBLICATIONS

Machine Translation of KR 10-2011-0125957 to Jang, et al. (Year: 2011).*

(Continued)

*Primary Examiner* — Daniel C. McCracken
(74) *Attorney, Agent, or Firm* — Lumen Patent Firm

(57) ABSTRACT

A method of fabricating polyacrylonitrile (PACN) nanostructured carbon superstructure shapes is provided that includes forming a PACN polymer superstructure shape by using as a monomer, an initiator, and a solvent or incorporation of a different co-monomer for free radical polymerization, and converting the PACN polymer superstructure shape to a nanostructured carbon superstructure analogue using stabilization and carbonization of the PACN polymer (Continued)

superstructure shape, where the stabilization includes heating the PACN polymer superstructure shape to a temperature that is adequate to form a stabilization reaction, where the carbonization includes using a heat treatment.

4 Claims, 13 Drawing Sheets

(52) U.S. Cl.
CPC ...... *C01P 2002/85* (2013.01); *C01P 2004/03* (2013.01); *C01P 2004/04* (2013.01); *C01P 2006/12* (2013.01); *C01P 2006/16* (2013.01)

(56) References Cited

U.S. PATENT DOCUMENTS

2015/0118142 A1  4/2015  Dyke
2016/0145772 A1  5/2016  Yoon

FOREIGN PATENT DOCUMENTS

KR     20110125957    11/2011
KR     20180126202    12/2018
WO     WO2019034982   2/2019

OTHER PUBLICATIONS

Korobeinyk, High temperature oxidative resistance of polyacrylonitrile-methacrylate copolymer powder converting to a carbonized monolith, European Polymer Journal 2012; 48: 97-104 (Year: 2012).*
Chen, et al., Highly Tunable and Facile Synthesis of Uniform Carbon Flower Particles, J. Am. Chem. Soc. 2018; 140: 10297-10304 (Year: 2018).*
Chen et al. Highly Tunable and Facile Synthesis of Uniform Carbon Flower Particles. JACS 2018, 140, 10297-10304.
Korobeinyk et al. High Temperature oxidative resistance of polycarylonitrile-methylmethacrylate copolymer powder converting to a carbonized monolith. Europ. Polymer J. 48 2012 97-104.

* cited by examiner

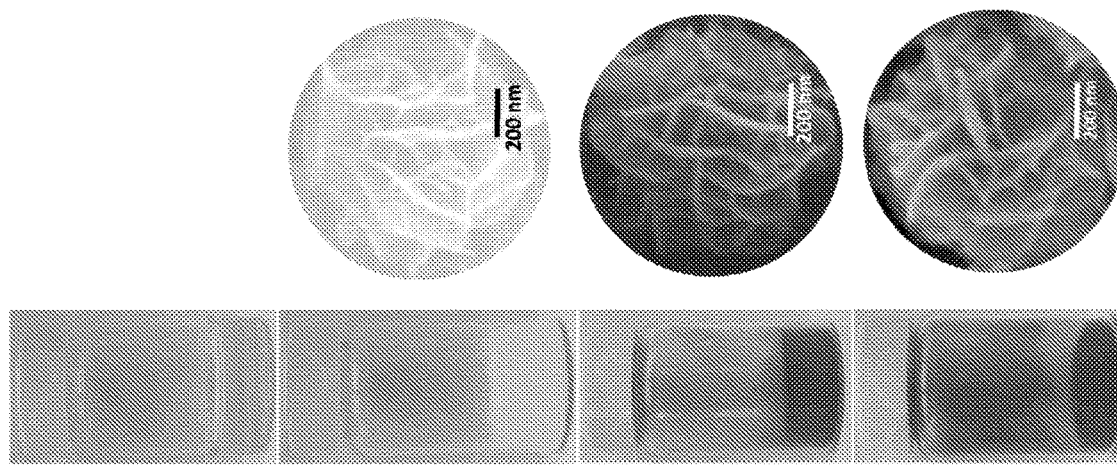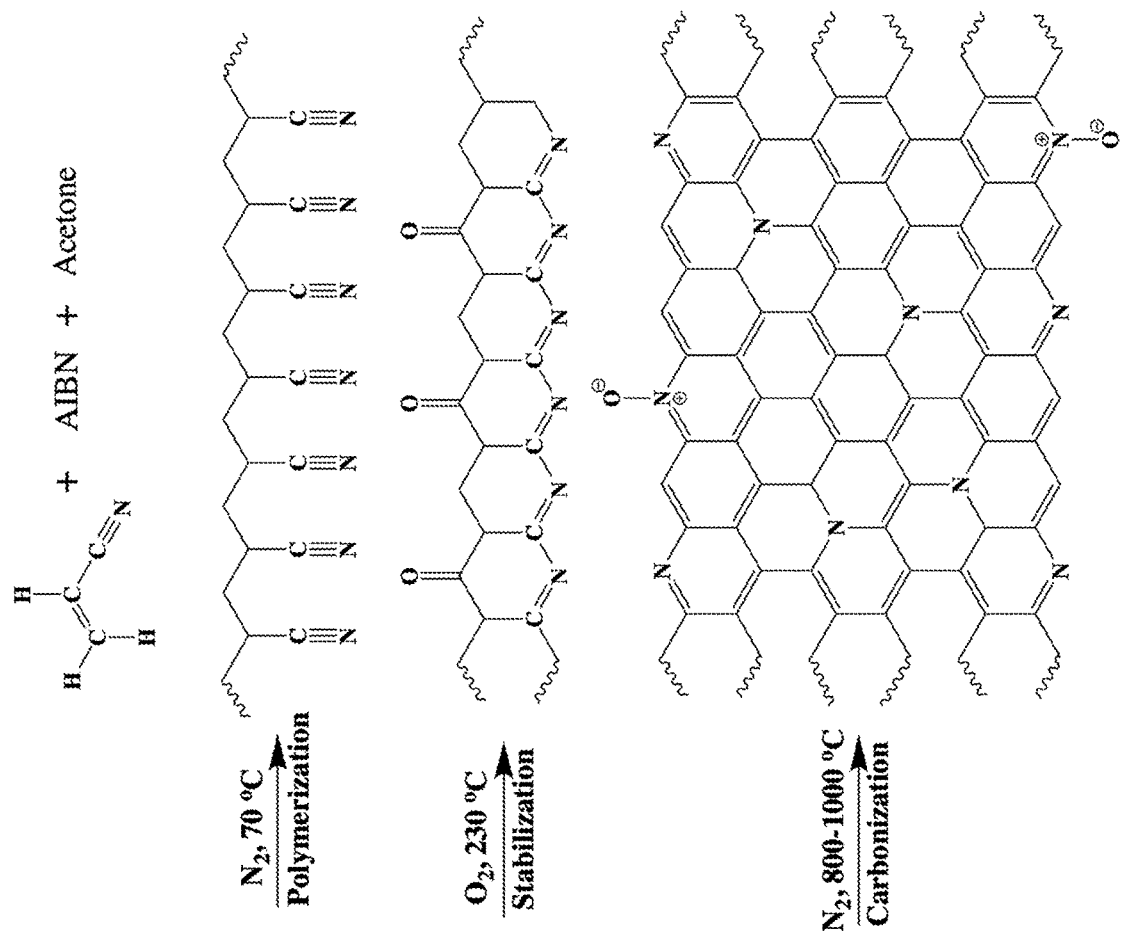
FIG. 1A

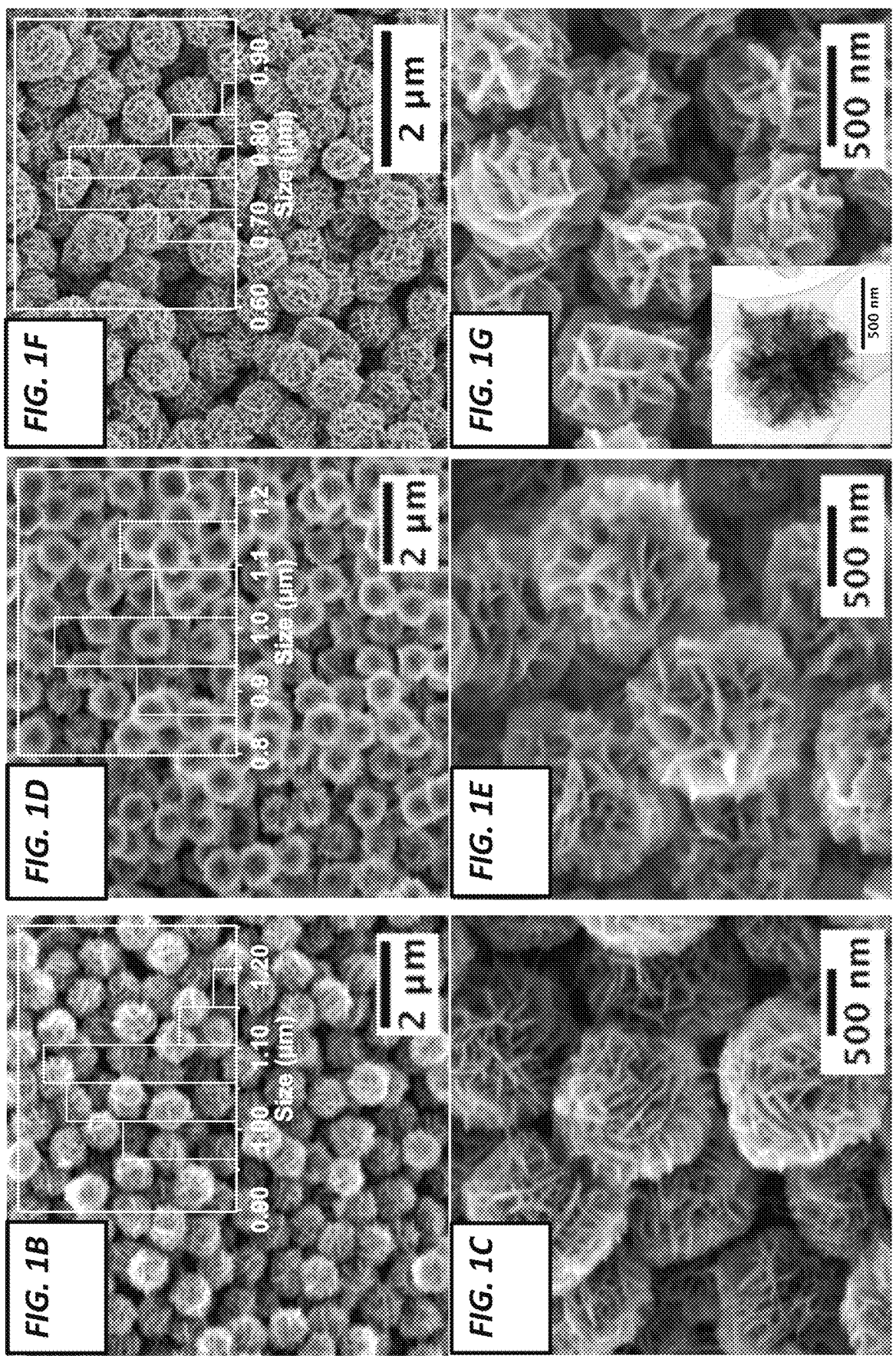

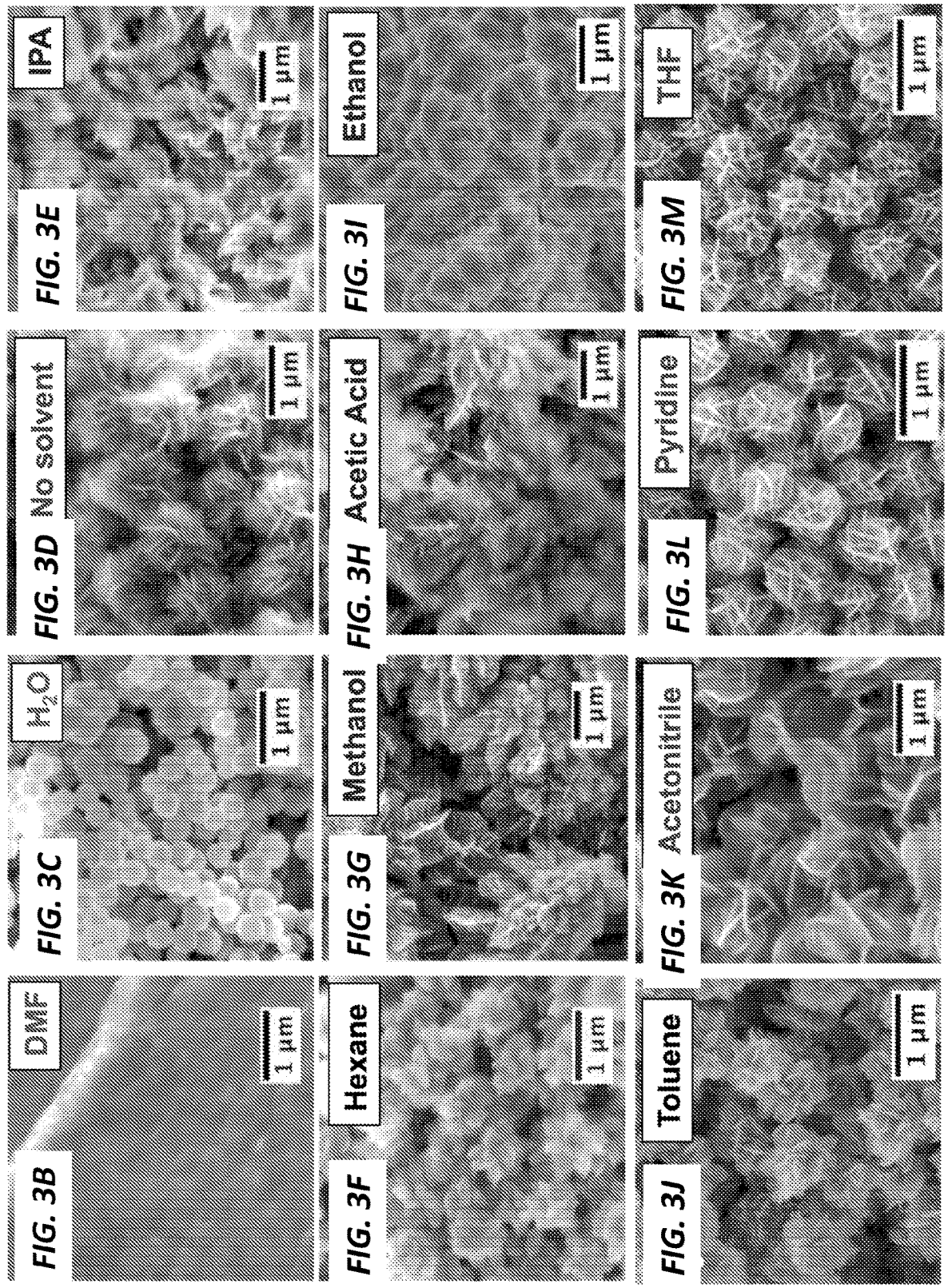

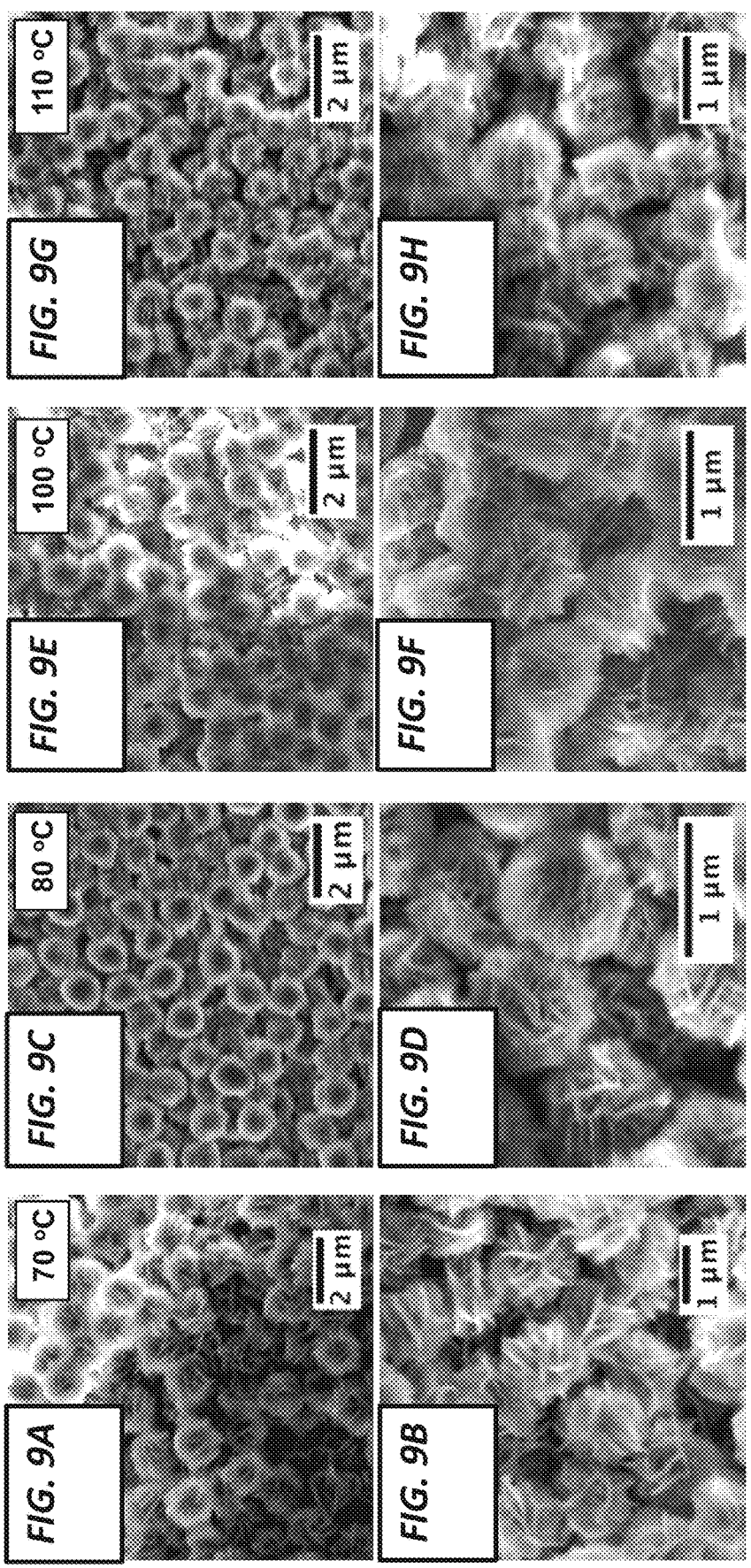

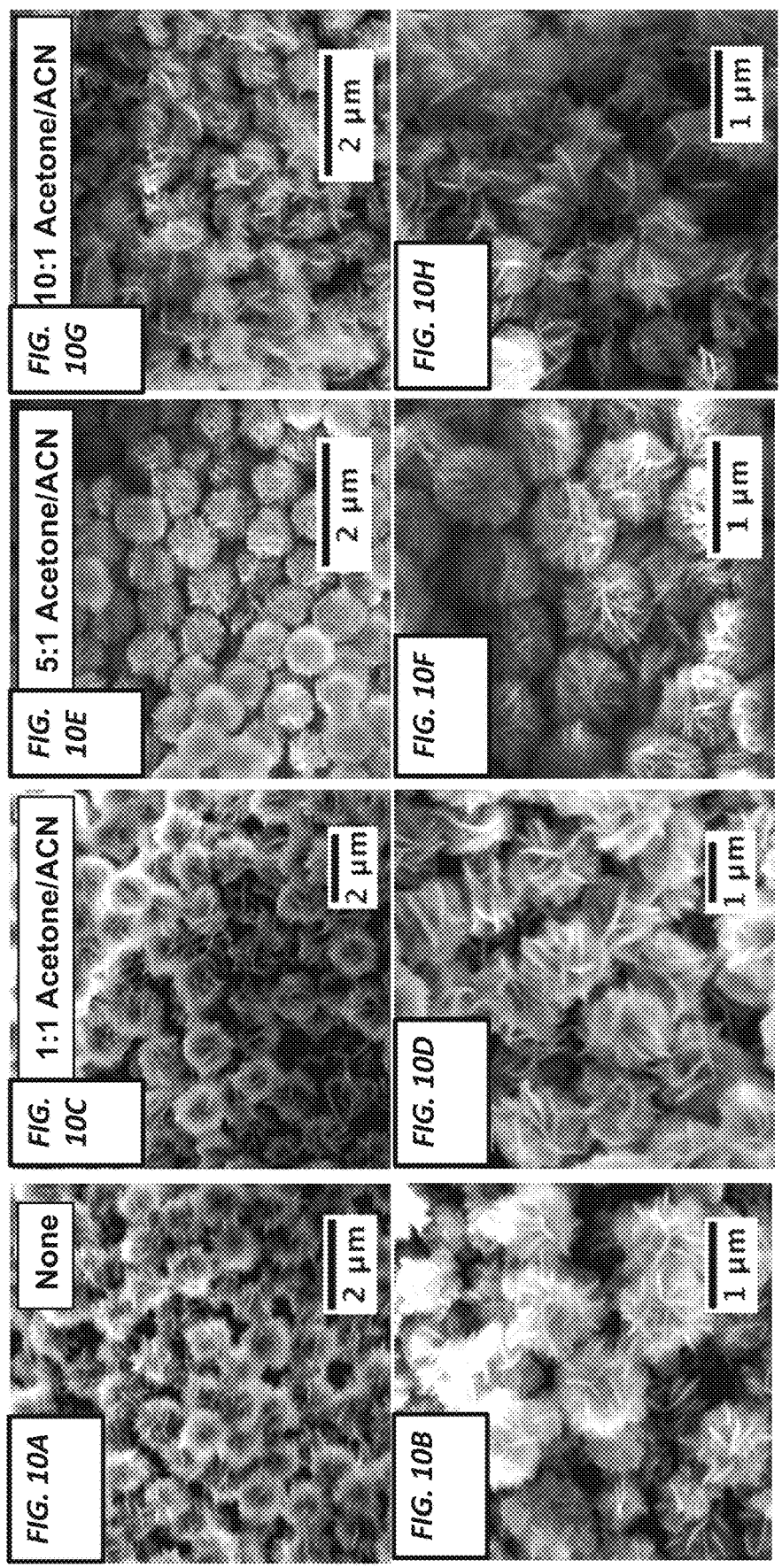

POLYARYLONITRILE SYSTEM FOR PREPARING MULTIFUNCTIONAL CARBON FLOWERS AND OTHER SUPERSTRUCTURES

FIELD OF THE INVENTION

The current invention relates generally to carbon flowers. More specifically, the invention relates to a simplified method of fabricating tunable carbon flowers.

BACKGROUND OF THE INVENTION

Carbon-based materials have drawn increasing interest for various environmental and energy applications, such as water purification, gas storage and separation, electrocatalysts, supercapacitors and batteries. They are low cost, earth abundant, and also have a wide tunability of properties through variation of parameters, such as degree of graphitization, microtextures, surface area, pore volume and pore size distribution, chemical composition through incorporation of heteroatoms, and a rich variety of dimensionality ranging from 0 to 3D. In particular, 3D hierarchical porous carbon materials containing interconnected micropores, mesopores and macropores are of great interest for energy applications since they not only provide high accessible surface area but also fast ion transport for high rate capability. For example, carbon nanohorns, which have conical carbon nanostructures, exhibit interesting behavior resulting from their specific conical morphology. However, their synthesis usually involves injection of energy to vaporize and restructure graphite and this causes their aggregation into spherical clusters, blocking functionalization and treatment of individual nanocones and consequentially limiting their research development. Besides carbon nanohorns, carbon materials with flower-like super-structures (namely, carbon flower) also possess unique shapes and advantageous properties, but are still relatively rare. Their open structure offers more exposed active sites and facile transport of ions, while the extended nanopetals intersecting each other facilitate transport of electrons. The unique structure also makes them an ideal candidate as a support for electrocatalysis and energy storage applications. For example, carbon flower/sulfur composites have been used as cathode materials for lithium-sulfur batteries with improved performance and $Fe_3O_4$/carbon flower have been explored for lithium-ion battery anodes. Flower-like hierarchical carbon superstructures have also been independently used for batteries, supercapacitors and electrocatalysts for oxygen reduction reactions. However, controllable synthesis of carbon materials with such desired morphology is challenging. Only a few methods have been reported so far for the synthesis of carbon flowers. They usually require multi-step polymerization and assembly processes to prepare the polymer precursors or tedious multi-step processes involving complicated templating and subsequent etching steps. Moreover, most of the reported carbon flower structures have relatively large and non-uniform sizes, which limit their applications.

What is needed is a facile and efficient synthetic method for fabricating uniform-sized carbon flower particles.

SUMMARY OF THE INVENTION

To address the needs in the art, a method of fabricating polyacrylonitrile (PACN) nanostructured carbon superstructure shapes is provided that includes forming a PACN polymer superstructure shape by using as a monomer, an initiator, and a solvent or incorporation of a different co-monomer for free radical polymerization, and converting the PACN polymer superstructure shape to a nanostructured carbon superstructure analogue using stabilization and carbonization of the PACN polymer superstructure shape, where the stabilization includes heating the PACN polymer superstructure shape to a temperature that is adequate to form a stabilization reaction, where the carbonization includes using a heat treatment.

According to one aspect of the invention, the monomer can include acrylonitrile (ACN), styrene, vinyl chloride, acrylate, methacrylate, methyl methacrylate, acrylamide, 1,3 butadiene or other free radical polymerization monomers.

In another aspect of the invention, the initiator includes a thermal initiator azobisisobutyronitrile (AIBN), thermal initiators, or photoinitiators, where the AIBN has a concentration in a range of 0.02 wt % to 0.5 wt %.

In a further aspect of the invention, the solvent can include acetone, water, DMF, methanol, ethanol, acetic acid, IPA, polyacrylonitrile, acrylonitrile, acetonitrile, pyridine, THF, toluene, isopropanol, hexane, or other chemical solvents.

In yet another aspect of the invention, the co-polymer can include acrylic acid (AA), styrene (S), methyl methacrylate (MMA), or other free radical polymerization monomers.

According to one aspect of the invention, the stabilization includes oxidative stabilization in air at a temperature in a range of 180° C.-300° C.

In another aspect of the invention, the stabilization includes oxidative stabilization in air for a ramping rate of 0.1° C./min-5° C./min in a range of 2-12 hours.

In a further aspect of the invention, the carbonization includes the heat treating the PACN polymer flower in an inert gas at a temperature in a range of 600° C.-1500° C.

According to another aspect of the invention, the carbon superstructure can include a flower-shape, a pompom-shape, a tree leaf-shape, a petal-shape, or other superstructures enabled by this invention.

BRIEF DESCRIPTION OF THE DRAWINGS

FIGS. 1A-1G show (1A) Synthetic scheme of PACN and carbon flowers with the appearance of the samples at each stage. SEM images of (1B-1C) PACN flowers (PACN-F), (1D-1E) Stabilized PACN flowers at 230° C. (PACN-F-230C), (1F-1G) Carbonized PACN flowers, i.e. carbon flowers, at 1000° C. (PACN-F-1000C), at different scales, with histogram showing the size distribution. The TEM image of carbon flower was inserted in (1G), according to the current invention.

FIGS. 3A-3M show (3A) 2D Plot with Hansen parameters as the descriptors, the locations of common solvents are listed. (3B-3M) SEM images of PACN particles prepared from different solvents, according to the current invention.

(FIG. 5D) Summary of the N concentration and BET surface area for different materials, according to the current invention.

FIGS. 8A-8I show SEM images of PACN flowers (8A-8B) from 0.02 wt % AIBN, (8C-8D) from 0.1 wt % AIBN, (8E-8F) from 0.3 wt % AIBN, (8G-8H) 0.5 wt % AIBN at different scales for 1 hour reaction time, with the sizes summarized, according to the current invention. In addition to the observed faster formation of white precipitates, the final PACN particle shape and size were found to be almost invariant with increasing initiator loading (FIGS. 8A-8I).

FIGS. 9A-9H show SEM images of PACN flowers (9A-9B) prepared at 70° C., (9C-9D) prepared at 80° C., (9E-9F) prepared at 100° C., (9G-9H) prepared at 110° C., for 1 hour reaction time at different scale bars, according to the current invention.

FIGS. 10A-10H show SEM images of PACN flowers (10A-10B) prepared without adding acetone, (10C-10D) prepared with 1:1 acetone/ACN ratio, (10E-10F) prepared with 5:1 acetone/ACN ratio, (10G-10H) prepared with 10:1 acetone/ACN ratio at different scale bars, according to the current invention.

DETAILED DESCRIPTION

Figure 2:
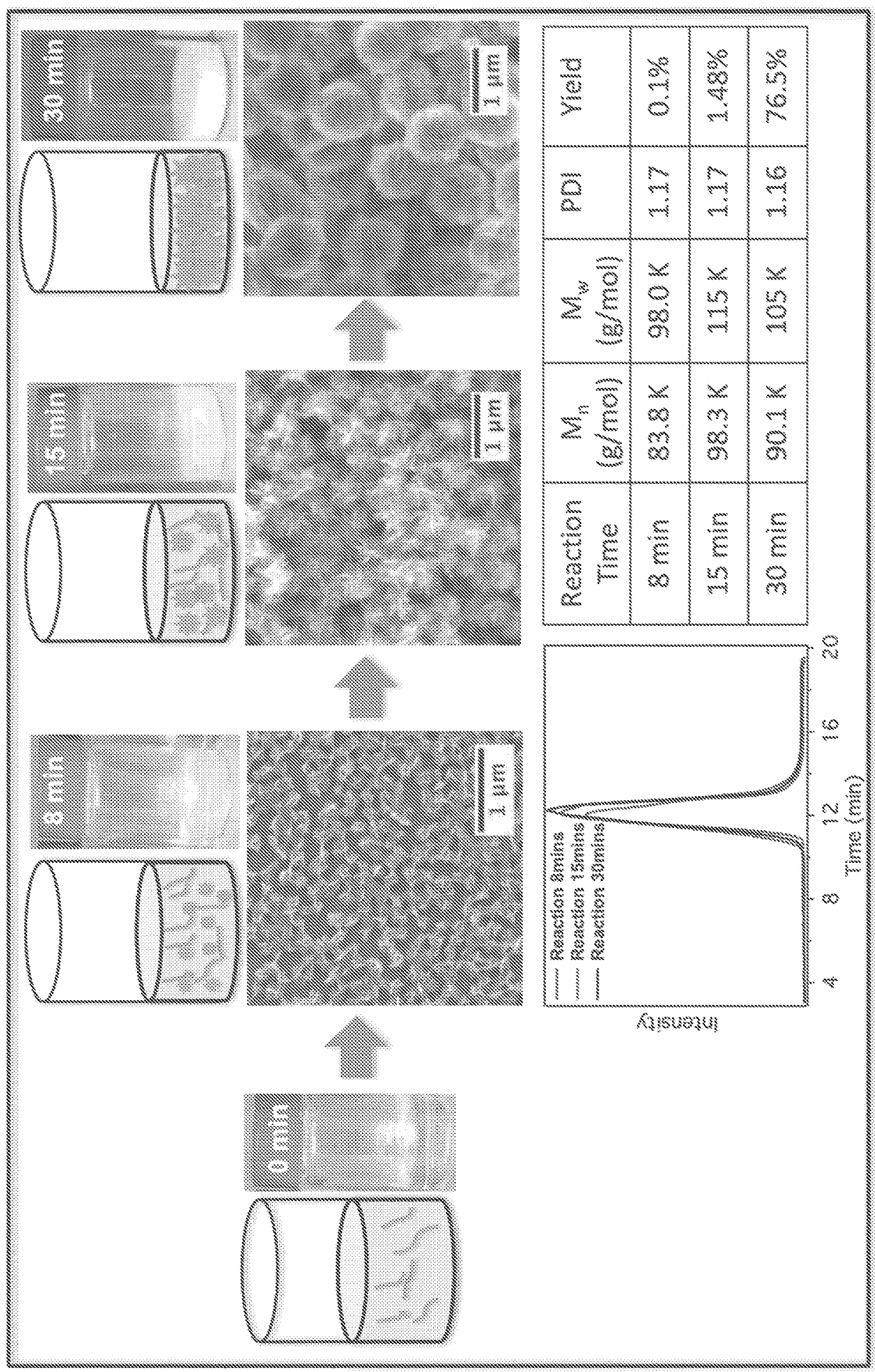
FIG. 2 shows growth and formation process of PACN flowers in acetone, with the graphic scheme, SEM images, and reaction samples, and GPC results at different reaction time listed. Mn: the number average molecular weight; Mw: the weight average molecular weight; PDI: polydispersity index, according to the current invention.

The current invention provides a tunable method to synthesize polyacrylonitrile (PACN) nanostructured particles with various superstructures (flower, pompom, hairy leave and petal shapes) by a one-step free-radical polymerization process. The shapes of these polymer particles can be tuned by using different solvents or by incorporating other co-monomers. By constructing a Hansen solubility parameter plot, suitable solvents are identified (see Table 1) for desired PACN particle shapes. The obtained uniform PACN flower-like structures were readily converted to flower-shaped carbon particles with tunable porosity via various gas treatment methods. The resulting carbons had diameters around 750 nm and exhibited high N-doping concentration (7-15 at %). The current method enables synthesizing carbon materials in a simple and controlled way with unique morphology, high surface area, and tunable heteroatom content for future applications in electrochemical energy conversion and storage, such as supercapacitors, electrocatalysts and lithium-sulfur batteries, wastewater treatment and gas storage.

TABLE 1

Hansen solubility parameter for polyacrylonitrile and different solvents. Values for solvents (from HSP handbook in SI units) were divided by two to obtain "standard" solubility parameter units for comparison to PACN solubility parameter data.

| Solvent/polymer | $\delta_d$ | $\delta_p$ | $\delta_h$ |
| --- | --- | --- | --- |
| Polyacrylonitrile | 9 | 7.9 | 3.3 |
| Acrylonitrile | 8 | 6.4 | 3.4 |
| Acetonitrile | 7.65 | 9 | 3.05 |
| Acetone | 7.58 | 5.1 | 3.4 |
| Pyridine | 9.5 | 4.4 | 2.95 |
| THF | 8.4 | 2.85 | 4 |
| Toluene | 9.0 | 0.7 | 1.0 |
| Hexane | 7.24 | 0 | 0 |
| Methanol | 7.55 | 6.15 | 11.15 |
| Ethanol | 7.9 | 4.4 | 9.7 |
| Acetic Acid | 7.25 | 4 | 6.75 |
| Isopropanol | 7.9 | 3.05 | 8.2 |
| Water | 7.8 | 8 | 21.15 |
| DMF | 8.7 | 6.85 | 5.65 |

Three-dimensional hierarchical porous carbon materials with flower-like superstructures are of great interest for energy applications since their unique shape not only provides high accessible surface area and consequently more exposed active sites, but also facilitates ion transport for high-rate capability. However, finding a controllable way to make porous carbons with such specific shapes has been challenging. The invention provides a tunable and simple method for one-pot synthesis of polyacrylonitrile and its copolymer nanostructured particles with various superstructures (flower, pompom, hairy leave and petal shapes) controlled by employing various solvents or by the incorporation of different co-monomers. The correlation between polymer particle shapes and solvent properties has been identified through Hansen solubility parameters analysis. The obtained uniform polyacrylonitrile particles could be readily converted into porous carbons by high-temperature gas treatment while maintaining the original shape of the polymer precursor structures. The resulting carbon materials have high nitrogen-doping concentration (7-15 at %) and tunable porous structures. This novel synthetic method provides a simple way to make porous carbons with controllable morphology and potentially advantageous properties for a variety of potential energy and environmental applications, such as electrochemical energy conversion and wastewater treatment.

Turning now to the synthesis, in one embodiment, PACN flowers (PACN-F) were prepared via free radical polymerization using acrylonitrile (ACN) as the monomer, azobisisobutyronitrile (AIBN) as the initiator, and acetone as the solvent, where the AIBN has a concentration in a range of 0.02 wt % to 0.5 wt %. Then, stabilization and carbonization steps were carried out to convert these PACN flowers to carbon flowers. The synthetic process is summarized in FIG. 1A, with the appearance of the material at each stage shown. After polymerization, the PACN polymer was collected in the form of white powders, and scanning electron microscopy (SEM) images (FIGS. 1B-1C) showed that they included of uniform particles with an average diameter of 1.05 μm with flower shapes and fine petals. The stabilization process converted these white PACN powders to brown powders (PACN-F-230C), with the flower shape and its uniformity well preserved (FIGS. 1D-1E). The average size reduced slightly to 1.0 μm, which may come from the cyclization and rigidification of PACN particles. Subsequent carbonization at 1000° C. in an inert gas environment transformed the oxidized flowers to black carbon flowers (PACN-F-1000C) (FIGS. 1F-1G).

Figure 7A:
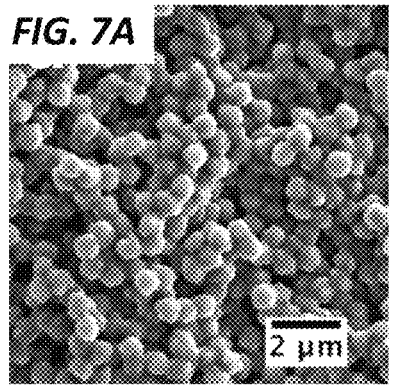
FIGS. 7A-7D show SEM images of (7A-7B) PACN flowers carbonized at 900° C. in $N_2$ without prior stabilization. (7C-7D) PACN flowers carbonized at 1000° C. in $N_2$ with insufficient stabilization, according to the current invention.
Figure 7B:
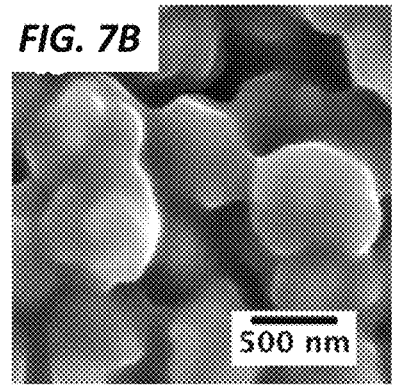
Figure 7C:
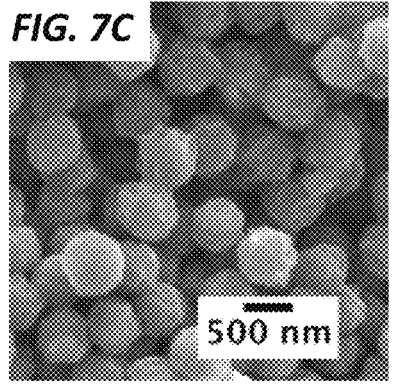
Figure 7D:
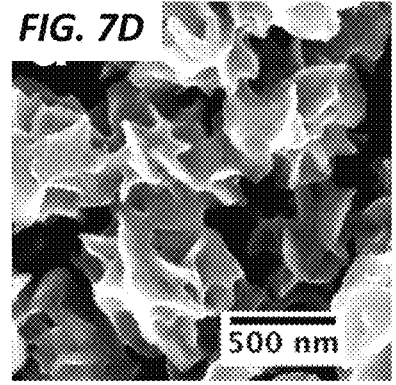
Figure 8I:
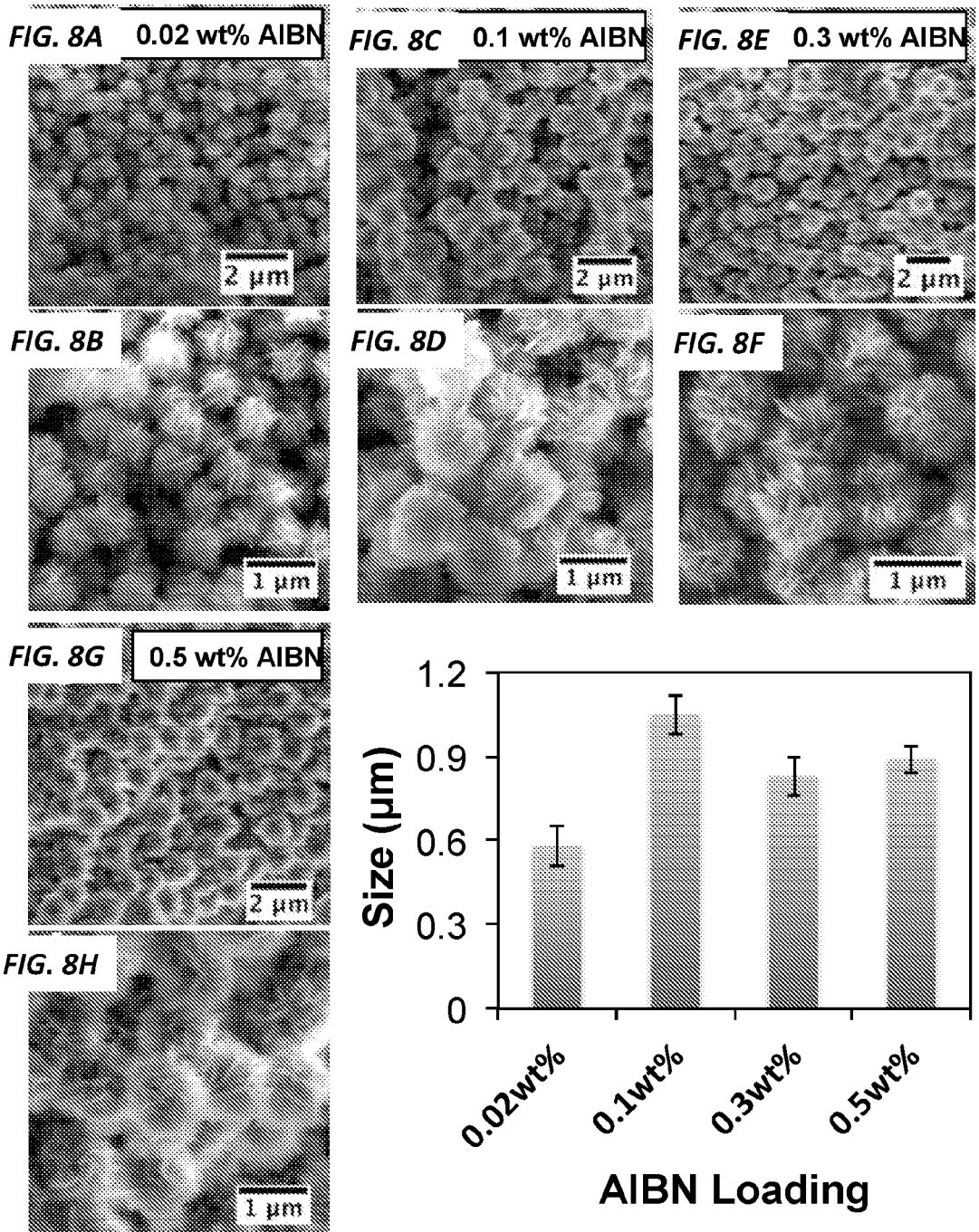

The particles again further shrunk to 750 nm. Transmission electron microscopy (TEM) images showed that these particles were not solid inside, but composed of assemblies of sheets with porosity (FIG. 1G and FIGS. 6A-6C). It is worth noting that the stabilization step plays an important role here to preserve the flower structure during carbonization. Polyacrylonitrile is the most commonly used polymer precursor for producing carbon nanofibers due to its excellent mechanical properties and high stability. One of the key steps during carbon fiber preparation is the oxidative stabilization of PACN fibers in air, where the oxidative stabilization in air at a temperature in a range of 180° C.-300° C. Further, the oxidative stabilization in air has a ramping rate of 0.1° C./min-5° C./min in a range of 2-12 hours. The stabilization process changes the chemical structure of PACN. It has been shown that a thermally stable ladder structures is formed during stabilization, which made it possible for the PACN fibers to maintain theirs shapes with excellent mechanical properties during high temperature carbonization treatment. To find the optimal stabilization conditions for the preservation of flower shapes, different treatment conditions at 230° C. were explored. It was found that without the stabilization step, all the flower superstructures would collapse during the subsequent carbonization to form fused carbon nanoparticles (FIGS. 7A-7B). If there was an insufficient stabilization time or the ramping rate is too high (1° C.-5° C./min), isolated particles can still be obtained, but the particles would partially collapse (FIGS. 7C-7D). Finally, when the polymer particles were stabilized in air at 230° C. for 2 h at a ramping rate of 0.1° C./min, the flower shape can be nicely maintained.

To study the formation and growth process of the PACN flower-like particles, the reaction products at different stages (8 min, 15 min, 30 min) were quenched for characterizations. As seen in FIG. 2, at the beginning, the monomer and solvent (acetone) were miscible with each other and formed a clear solution. After reacting for 8 minutes, the solution turned cloudy with some white precipitates formed. The SEM image showed uniform seed flower-like particles with diameters less than 100 nm already formed at this stage. Gel permeation chromatography (GPC) tests revealed the polyacrylonitrile polymer composing these small flower particles already had a relatively high weight averaged molecular weight ($M_w$=98,000 g/mol). Surprisingly, the as-synthesized polymer has a very low polydispersity index (PDI=1.17), even lower than the reported polyacrylonitrile prepared from low temperature reversible addition-fragmentation chain transfer (RAFT) living polymerization (PDI=1.25, $M_w$=170,000 g/mol). Further reaction resulted in the formation of more white precipitates. At the reaction time of 15 minutes, the PACN flower-like particles had grown to a much larger size of around 400 nm in diameter. After 30 minutes, the reaction completed and the particles grew to as large as 1 μm in diameter. GPC results showed that the PACN polymers at 15 and 30 minutes had similar molecular weights and low dispersity as the ones of earlier stage at 8 minutes. These observations suggest that the polymer particles grew throughout the reaction time but that the polymerization, once initiated, proceeded quickly to reach a certain molecular weight. It is likely that the limited solubility of the polymers in the solvent led to its precipitation, which resulted in similar PACN molecular weights at different reaction times. The self-assembly of the precipitated polymer eventually grow into flower-like particles. At the beginning, monomer and initiator are present homogeneously in the medium. Upon heating, AIBN decomposes into free radicals to initiate the polymerization of ACN. When the polymers reach a critical chain length, they start to precipitate to form primary nuclei. From this stage on, PACN polymers continue to form and are incorporated onto the seed particles. This continuous polymerization, self-assembly, and growth process carries on until all of the monomer is exhausted or all the large PACN flower-like particles precipitate out from the solution.

To further investigate the reasons for the formation of PACN superstructures, various synthetic conditions (i.e. initiator loading, reaction temperature, and monomer concentration) were studied. In addition to the observed faster formation of white precipitates, the final PACN particle shape and size were found to be almost invariant with increasing initiator loading (FIGS. 8A-8I). Higher temperature was observed to give rise to even faster polymerization rate, but the final morphology of particles remained almost the same (FIGS. 9A-9H). Moreover, when the monomer concentration was high (>10 vol %), changing the concentration did not affect much on the size and morphology of the flower superstructures (FIGS. 10A-10H). Interestingly, even without the addition of acetone, the monomer itself can also serve as the solvent for PACN flower particle formation (FIGS. 10A-10B). These observations further confirmed the earlier hypothesis that reaction propagation is faster than the initiation for the system, which is generally the case for free radical polymerization.

The effects of solvents on the self-assembly of polymer/block copolymer have been observed and discussed in the literature. For example, it has been found that the use of DMF as the solvent can result in the assembly of polyimide into microflower-like superstructures, but using N-Methyl-2-pyrrolidone (NMP) led to a different shape, but similar sized lantern-like microspheres. To investigate further the effects of solvents in the system of the current invention, several common solvents (water, DMF, isopropyl alcohol (IPA) and hexane) that have very different polarities were first tested. Interestingly, these solvents indeed produced different particle morphologies (FIGS. 3B-3C and (FIGS. 3E-3F). The as-synthesized PACN can dissolve well in DMF and as a result, no superstructure was formed (FIG. 3B). The use of $H_2O$, which does not dissolve acrylonitrile well, promoted emulsion polymerization and the formation of PACN spheres with diameters around 300 nm (FIG. 3C). For an alcohol solvent, IPA, irregular microparticles in the range of 2-4 micrometers that looked like "hairy leaves" were formed (FIG. 3E). It appears that these leaves consisted of many nanosheets. Finally, in a less polar organic solvent, hexane, resulted in another interesting superstructures: irregular particles with flower-like structures. The size of these particles is similar as the flower particles from acetone, but with less well-defined shape (FIG. 3F). These results suggest that the nature of the solvent has a crucial impact on the particle formation.

To gain a deeper understanding on the role of solvent in the formation of superstructures in this PACN system, Hansen solubility parameters (HSPs) were used to find correlations to the formation of flower-like structures. HSPs describe interaction energy through contributions from three types of cohesion energy: dispersion forces derived from atomic forces (the "non-polar" interactions, denoted as ED), permanent dipole-permanent dipole forces causing the polar cohesive energy (inherent molecular interactions, denoted as Ep), and hydrogen bonding (attraction among molecules because of the hydrogen bonds, denoted as EH). Materials with comparable HSP values are expected to have high affinity for each other and strong interactions. Hansen has described the relationship of cohesion energy density ($\delta^2$=E/V where V is the molar volume) with the individual Hildebrand solubility parameters as follows:

$$\delta^2 = \delta_d^2 + \delta_p^2 + \delta_h^2$$

where
$\delta_d$=solubility parameter due to dispersion forces,
$\delta_{13}$=solubility parameter due to dipole forces,
$\delta_h$=solubility parameter due to hydrogen bonding, or in general due to donor-acceptor interactions.

It has been shown that the contribution to the energy of mixing in polymer solutions from dispersion forces and dipole forces could be integrated into one descriptor (an enthalpy correction parameter):

$$\chi_H = \frac{V_m}{RT}((\delta_{d1} - \delta_{d2})^2 + (\delta_{p1} - \delta_{p2})^2)$$

where
$\delta_{d1}$=solubility parameter of polymer due to dispersion forces,
$\delta_{d2}$=solubility parameter solvent due to dispersion forces,
$\delta_{p1}$=solubility parameter of polymer due to dipole forces,
$\delta_{p2}$=solubility parameter of solvent due to dipole forces
$V_m$=average molar volume based on mole fractions Together with the second descriptor $\delta_h$, the full solubility characteristics could be described.

Figure 3A:
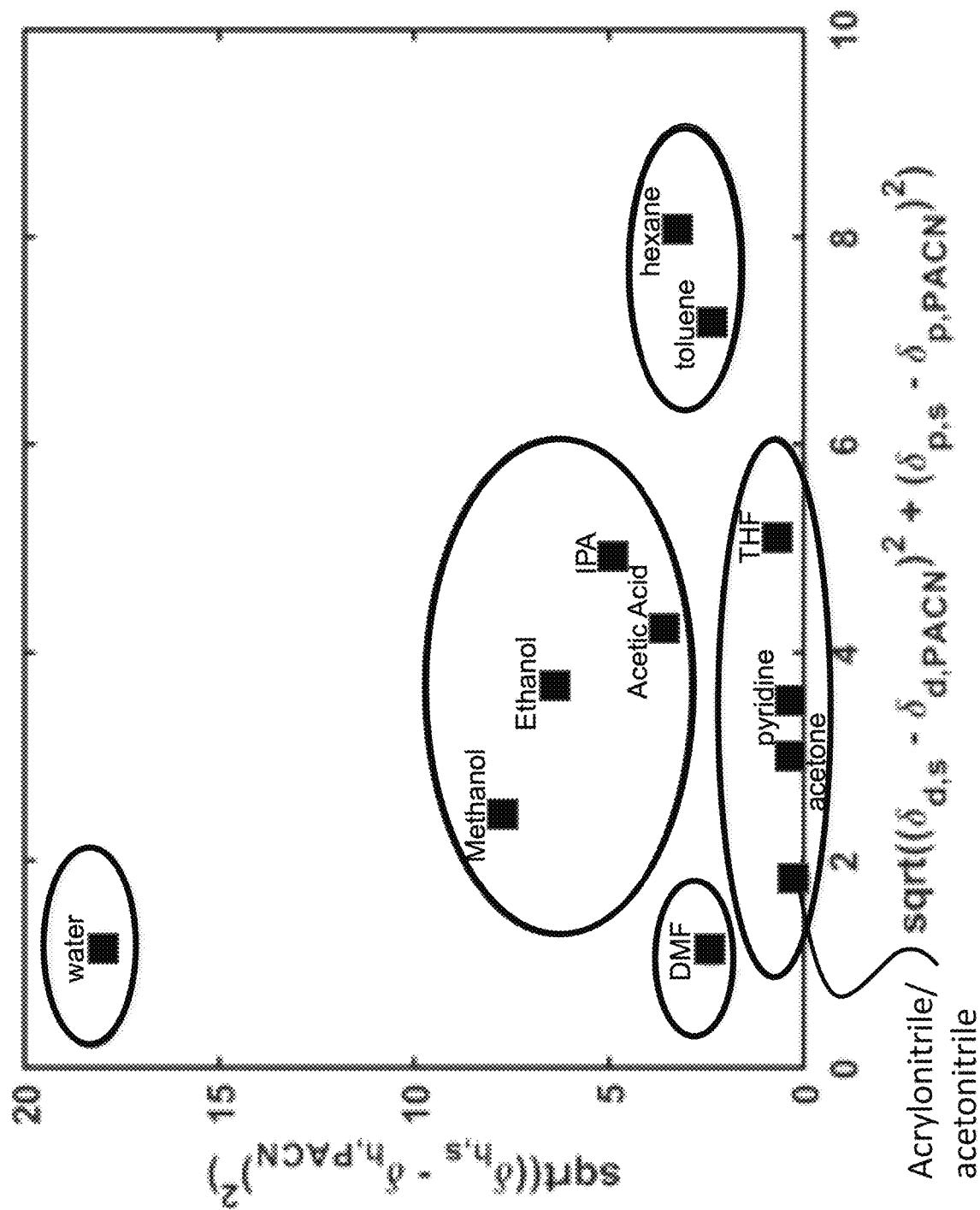

Based on these, a 2D plot was constructed to consider the interactions of PACN with various common solvent using $\sqrt{((\delta_{d,s}-\delta_{d,PACN})^2+(\delta_{p,s}-\delta_{p,PACN})^2)}$ and $\sqrt{((\delta_{h,s}-\delta_{h,PACN})^2)}$ as the x-axis and y-axis respectively (FIG. 3A).

As seen in FIG. 3A, the solvents were studied earlier ($H_2O$, DMF, IPA, hexane, acrylonitrile and acetone) are scattered around the plot. $H_2O$ is seen as an outlier solvent located on the top-left corner of the plot. It has a significantly higher hydrogen bond solubility parameter than PACN and can form strong hydrogen bonds with itself. DMF lies on the bottom-left corner because its solubility parameter is close to that of PACN due to dispersion forces and dipole forces. This suggests it might be a good solvent for PACN. Hexane lies on the bottom-right region of the plot whereas IPA lies in the middle region. Interestingly, for the two solvents which produced PACN flower-like particles (i.e. acrylonitrile, acetone), their values both lie close to y=0, which means they both have similar solubility parameter as PACN due to hydrogen bonding. These observations suggest $\delta_h$ is an important factor governing the formation of different superstructures in this system.

It has previously been shown that the formation of strong and accessible non-covalent interactions is a dominant factor in polymer self-assembly. It has been found in addition to molecular recognition and non-covalent interactions, geometric registration plays a crucial role, i.e. the conformation of the molecules has to allow for the maximum number of non-covalent interactions. In the case of PACN in acrylonitrile or acetone, PACN and the solvents have similar contributions from hydrogen bonding solubility parameters ($\delta_h$), and such a high affinity provides strong interactions between the solvent and PACN. The formation of flower-like structures, with extended petals has the potential to maximize the surface area for contact between PACN and the solvent. This may be the driving force for the formation of the flower-like structures. For the case of hexane, its solubility parameters due to dispersion forces and dipole forces are much larger than PACN and it has a slightly different $\delta_h$ from PACN. An irregular and less well-defined flower superstructure was observed (FIG. 3I). In contrast, IPA has a higher $\delta_h$ than PACN, and PACN may prefer to associate more exclusively with IPA and this results in the formation of irregular extended structures with sharp edges with tree-leave like morphology. Based on this hypothesis, a wider range of common solvents that lie in different solubility parameter space were further explored. Consistent with the predictions for the current invention, alcohol or acid solvents, such IPA, ethanol, methanol and acetic acid, all lie in the middle region highlighted by the blue circle (FIG. 3A) and gave rise to similar morphology with extend sharp edges (FIG. 3E and FIGS. 3G-3I). Toluene is located at similar solubility parameter space as hexane and resulted in less-defined flower structures (FIG. 3J). Meanwhile, three other solvents were selected that lie close to y=0 line, pyridine, tetrahydrofuran (THF) and acetonitrile and found that all of them produced well-defined flower superstructures, similar to acrylonitrile and acetone. It is also worth noting that these five solvents scatter along y=0 line and their energy of mixing in polymer solutions from dispersion forces and dipole forces are different. This further confirms that the hydrogen bond solubility parameter plays a key role in determining the formation of different superstructures. The hydrogen bonding solubility parameter is measured by subtracting the energetic contributions of dispersion and polar forces from the total cohesion energy so hydrogen bonding cannot unambiguously be pointed to as the single non-covalent interaction that governs the polymer morphology. However, the strong correlation between flower morphology and hydrogen bonding solubility parameters suggests a specific non-covalent interaction that is distinct from dispersion and dipole forces that governs the conformation of the polymer molecules.

Figure 4E:
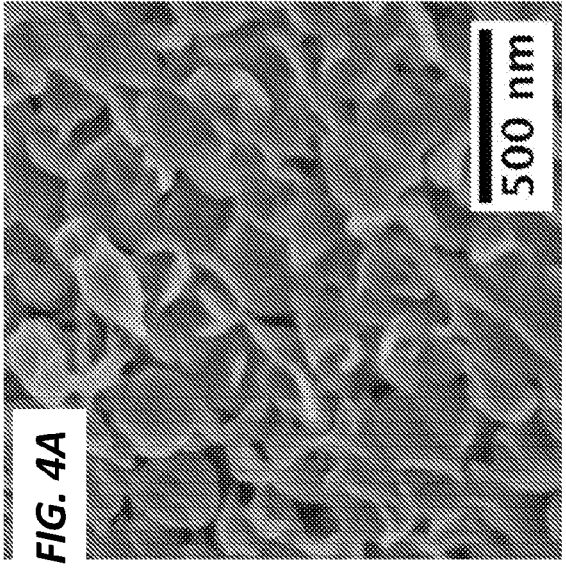
FIGS. 4A-4F show SEM images of: (4A) polymer and (4B) carbon flower petals prepared with addition of acrylic acid (AA) co-monomer; (4C) polymer and (4D) carbon pompoms prepared with addition of methyl methacrylate (MMA) co-monomer; (4E) polymer and (4F) carbon pompoms prepared with addition of styrene (S) co-monomer at different scales, with the TEM image of carbon pompom inserted in (4F). All co-monomers were added with 5 vol % loading vs. ACN, according to the current invention.
Figure 4F:
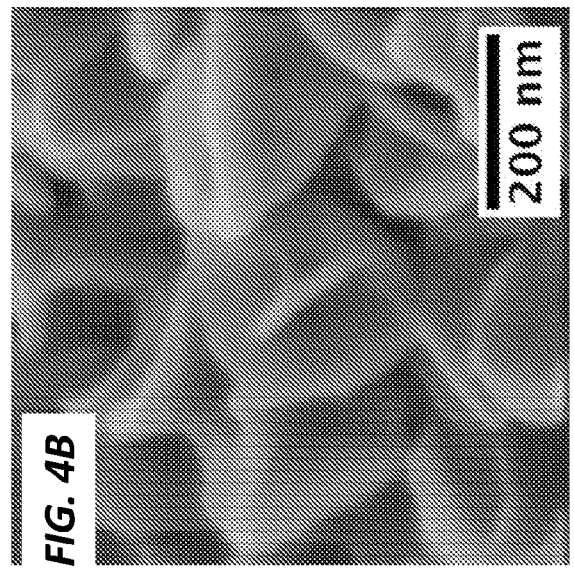
Figure 4C:
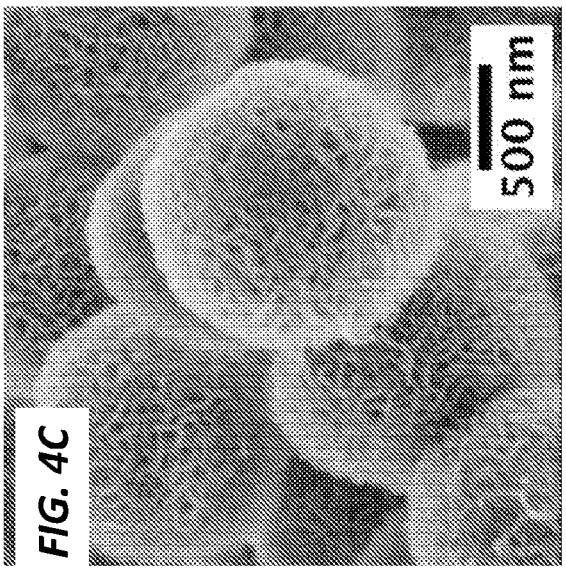
Figure 4D:
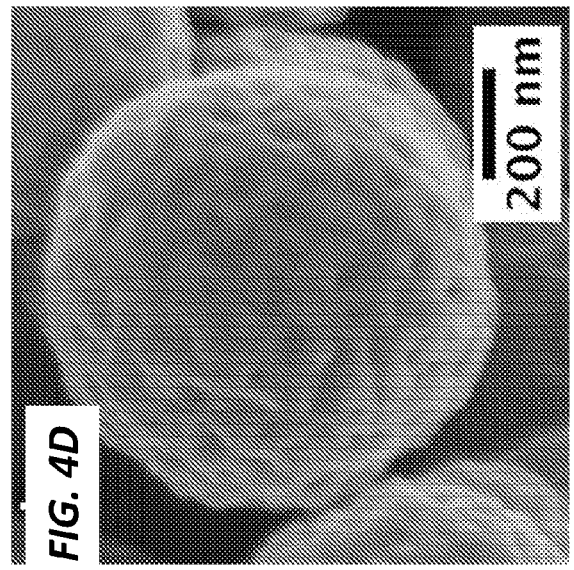
Figure 4A:
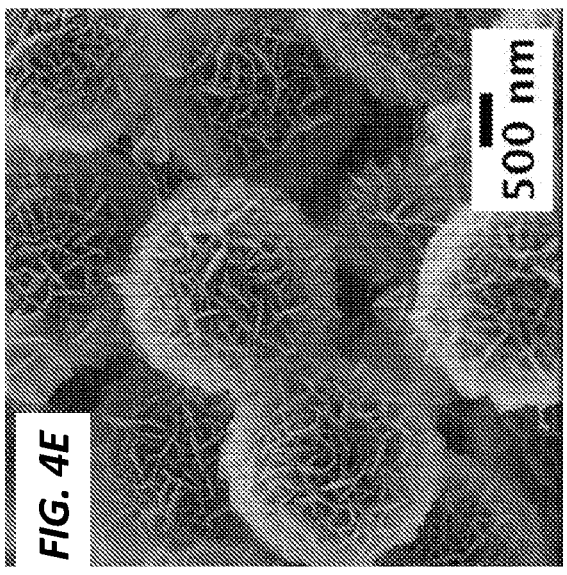
Figure 4B:
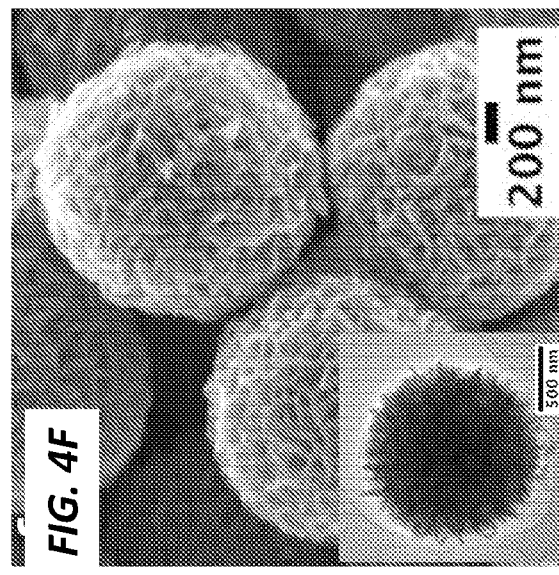

The current invention includes co-polymerization to tune the morphology of PACN polymer particle shapes. Since the solvent-PACN interactions described by the hydrogen bonding parameter are found to affect the particle superstructures, it is of great interest to explore the effects of adding a co-monomer on particles shapes. Such co-monomers may have other functionalities that give rise to different solubility parameters and a broader range of tunability. Therefore, three co-monomers, acrylic acid (AA), styrene (S) and methyl methacrylate (MMA), which are also in liquid state and amenable to free-radical polymerization, were tested with 5 vol % loading vs. ACN. Interestingly, the addition of these co-monomers resulted in striking differences on the final morphology of the polymer particles. As seen in FIG. 4A, incorporating AA (4.8 mol %) resulted in the formation of small flower petal-shaped particles. With sufficient air stabilization as described earlier, these petal-shaped structures can be well preserved after heat treatment at 1000° C. (FIG. 4B). On the other hand, addition of either MMA (3.1 mol %) or S (2.9=1%) formed pompom-like microparticles (FIG. 4C and FIG. 4E). However, after stabilization and carbonization, the fine structures partially collapsed for the poly(acrylonitrile-co-methyl methacrylate) particles. This may be attributed to the low melting point of poly(methyl methacrylate) around 160° C., which caused the structure to collapse before stabilization is completed. In contrast, polystyrene has a higher melting point (240° C.) than the stabilization temperature (230° C.), its pompom superstructure was well preserved in the final carbon structures (FIG. 4F). The TEM image (FIG. 4F) shows that the as-synthesized carbon pompom structure is not a hard sphere, but includes assembled sheets. These findings demonstrate that the PACN system is highly tunable for preparing different structured polymer and carbon particles by varying solvents or adding co-monomers.

Figures 5A, 5B, 5C, 5D:
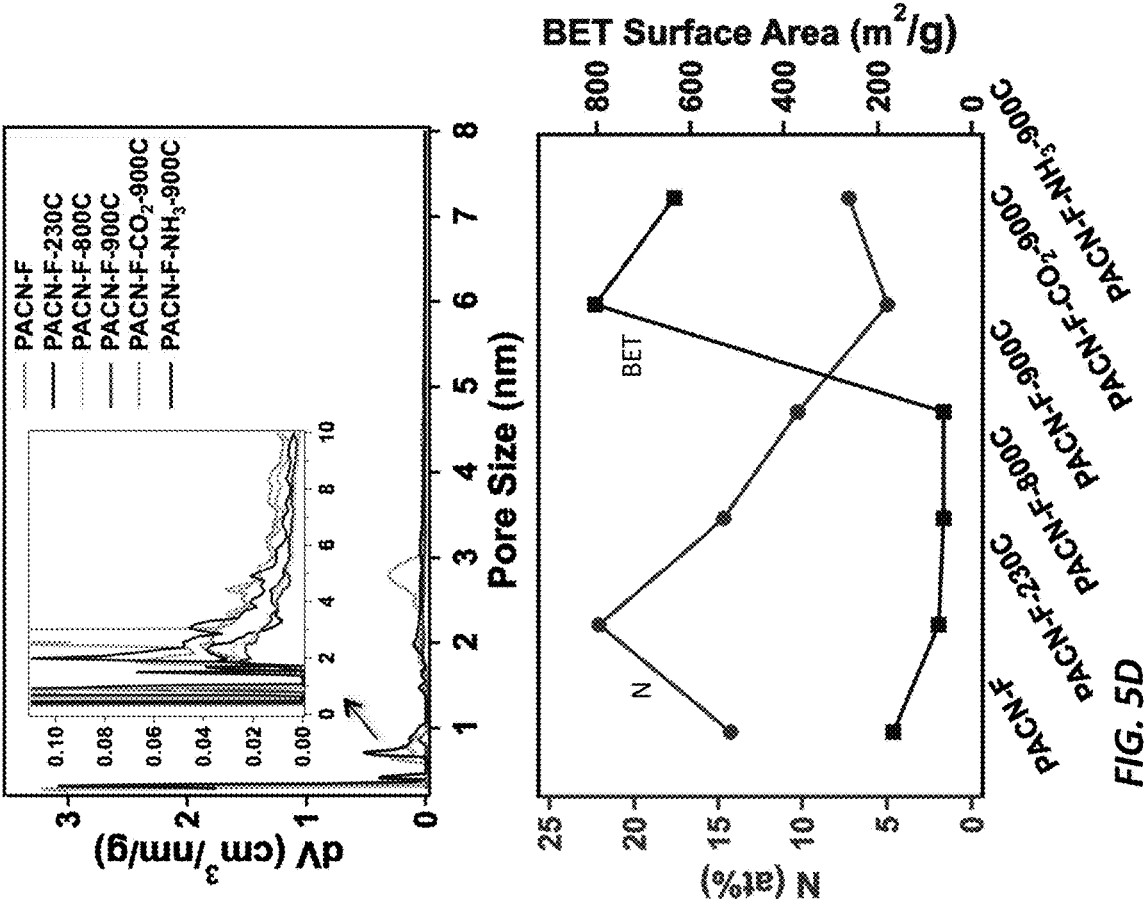
FIGS. 5A-5D show (5A-5B) nitrogen adsorption and desorption isotherms at 77K and pore size distributions for different PACN-F samples carbonized with different temperature and gas treatment. (5C) XPS survey scan for PACN-F samples carbonized with different temperature and gas treatment.
Figure 6A:
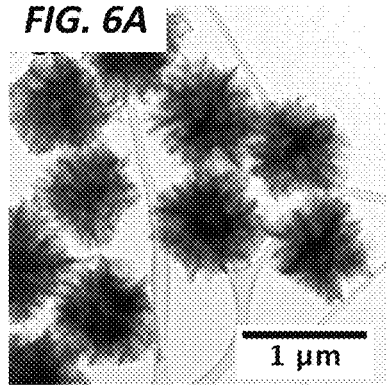
FIGS. 6A-6C show. TEM images of carbon flowers (PACN-F-1000C) at different scales, according to the current invention.
Figure 6B:
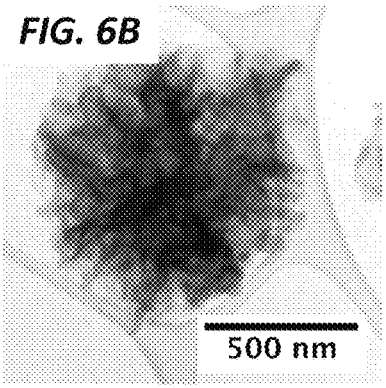
Figure 6C:
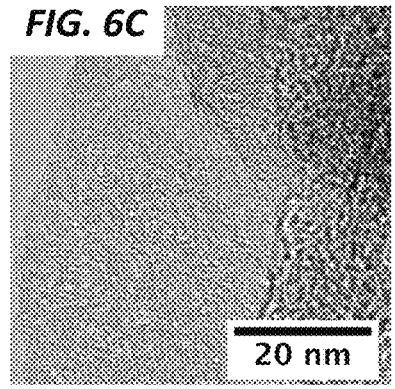
Figure 11A:
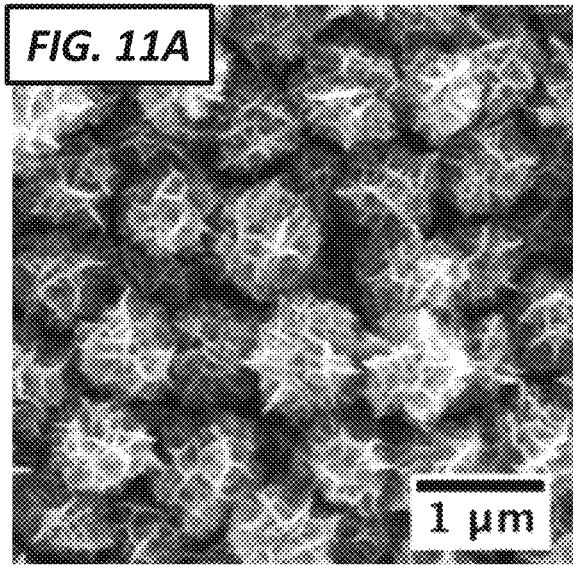
FIGS. 11A-11D show SEM images of (11A-11B) PACN-F-$CO_2$-900C, (11C-11D) PACN-F-$NH_3$-900C with different scales, according to the current invention.
Figure 11B:
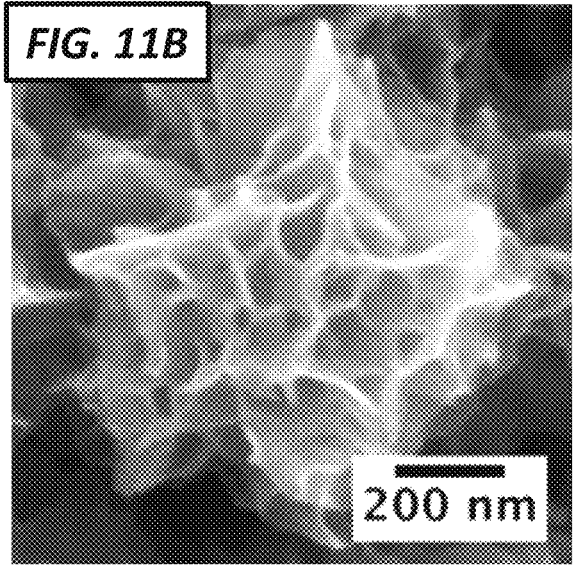
Figure 11C:
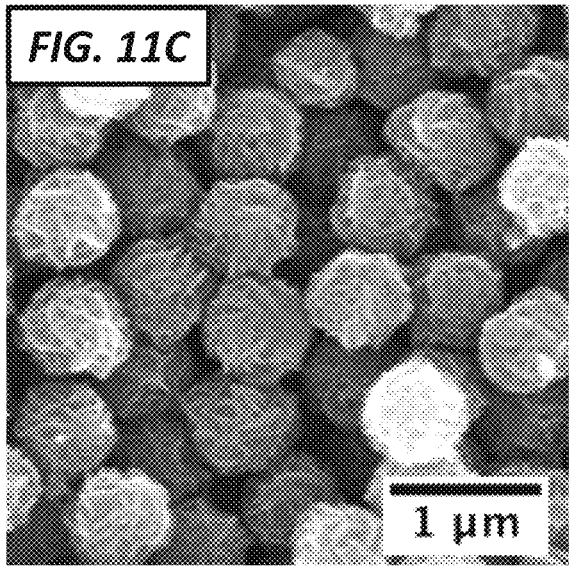
Figure 11D:
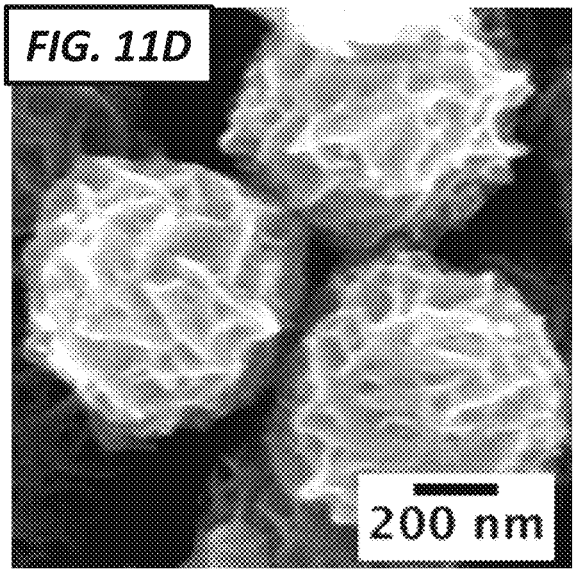

To gain an understanding of the porosity of the PACN flower particles (i.e. PACN-F), stabilized flowers at 230° C. (i.e. PACN-F-230C) and carbon flowers pyrolyzed at different temperatures after stabilization (denoted as PACN-F-xxxC, with xxxC as the treatment temperatures), $N_2$ adsorption and desorption measurements were carried out. As shown in FIG. 5A, all the PACN-Fs exhibited type-IV isotherms with a hysteresis loop, indicating the co-existence of micropores and mesopores. Pore size distributions calculated by nonlinear density functional theory (NLDFT) revealed that the particles consist of micropores less than 1 nm and mesopores centered around 2.5 nm. This hierarchical porous feature is expected, given the unique flower shapes of these particles. PACN flowers have a BET surface area as high as 168 $m^2/g$. But subsequent stabilization and carbonization steps reduced the surface area significantly, which may arise from the cyclization and rigidification of the structures, with PACN-F-230C and PACN-F-900C having a surface area of 72 $m^2/g$ and 60 $m^2/g$, respectively. The modest surface area is consistent with the observed particle shrinkage and size reduction from SEM images (FIGS. 1B-1G). The porosity of these particles can be further tuned by either $CO_2$ or $NH_3$ treatment. As shown in FIG. 5A, with $NH_3$ purging at 900° C. for 1 hour, the BET surface area of the treated carbon flower particles (PACN-F-$NH_3$-900C) can increase to 636 $m^2/g$, whereas $CO_2$ treatment (PACN-F-$CO_2$-900C) can increase it even further to 800 $m^2/g$. Interestingly, these two gas treatments promote the porosity of these particles differently. PACN-F-$CO_2$-900C has a distinct hysteresis loop and pore size distribution, which indicates there is significant increase of mesopores around 2.75 nm (FIG. 5B). SEM images (FIGS. 11A-11B) confirm the fine flower shape is well preserved after $CO_2$ treatment and the surface has been partially etched, producing more pores and thinner flakes. Conversely, PACN-F-$NH_3$-900C has less mesopores and the porosity increase arises mainly from the production of more micropores of less than 1 nm in size. The above observations demonstrate that the porosity of these PACN-Fs is also highly tunable with various gas treatments. This is of great importance since controlled tuning of different pore structures is highly desirable for various gas storage and electrochemical applications.

Figure 12:
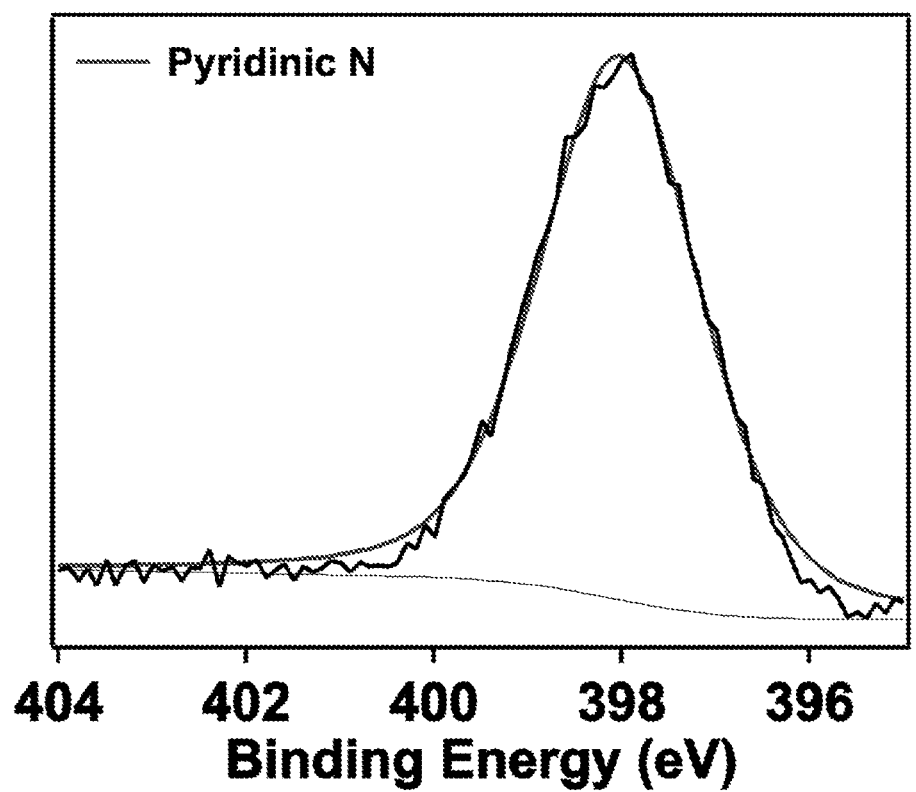
FIG. 12 shows high-resolution N1s xps spectra and peak fitting of PACN-F-230C reveals the presence of only pyridinic N (peak: 398.4±0.2 eV, according to the current invention.

To examine the chemical compositions of these PACNFs at different preparation stages, X-ray photoelectron spectroscopy (XPS) was conducted. PACN-F-230C had a composition of 67.3 at % C, 10.5 at % 0 and 22.1 at % N, giving a C/N/O ratio of 6/2/1 (FIG. 5C). This ratio is in good agreement with the ratio for the proposed stabilized cyclic structure shown in FIG. 1A. Moreover, only pyridinic N was detected in the air-stabilized PACN particles (FIG. 12). This suggests effective stabilization has been achieved at 230° C. using the current heating profile. The subsequent carbonization at higher temperatures resulted in the loss of nitrogen content, from 14.7 at % at 800° C. and 10.3 at % at 900° C., to 7.0 at % at 1000° C. (Table 2). It is worth noting that the N content is quite high for this carbon, almost two times higher than the N content typically reported in other literature under the same treatment temperatures. This arises from the unique stabilized structure of PACN as the carbonization precursor, which has both high stability and high N composition (33.3 at %). This is highly advantageous as N-doping in graphitic structure has been reported to play important roles as electrocatalysts for oxygen reduction reaction (ORR) and oxygen evolution reaction (OER), for gas and water adsorption, and for promoting the performance of supercapacitors. Moreover, despite having a high heteroatom content, PACN-F-1000C possesses a conductivity of 48 S/m for pressed powder, which is much higher than that of strutted graphene and comparable with that of activated carbons (10-100 S/m). The novel properties of these carbon flower materials: good uniformity with relatively small particle size around 800 nm, unique flower-shaped open structures and other shapes with extended petals, hierarchical and tunable porous structure with great accessibility, and high N concentration and good conductivity make them great candidates for various energy, environmental or electronic applications. The study of using these materials for the proposed applications is underway.

TABLE 2

Summary of the element compositions and pore volume

| Sample | C (at %) | O (at %) | N (at %) | BET Surface area ($m^2/g$) | Micropore Volume ($cm^3/g$) | Mesopore Volume ($cm^3/g$) |
|---|---|---|---|---|---|---|
| PACN-F | 42.9 | N.A. (H: 42.9) | 14.3 | 168 | 0.017 | 0.316 |
| PACN-F-230C | 67.3 | 10.5 | 22.1 | 72 | 0.013 | 0.084 |
| PACN-F-800C | 80.7 | 4.6 | 14.7 | 60 | 0.010 | 0.073 |
| PACN-F-900C | 87.3 | 2.4 | 10.3 | 60 | 0.012 | 0.074 |
| PACN-F-$CO_2$-900C | 80.7 | 14.3 | 5.0 | 803 | 0.351 | 0.303 |
| PACN-F-$NH_3$-900C | 90.3 | 2.4 | 7.3 | 636 | 0.297 | 0.139 |
| PACN-F-1000C | 89.6 | 3.4 | 7.0 | 61 | 0.012 | 0.100 |

In summary, a novel, highly tunable and facile method is provided for one-pot synthesis of PACN particles with different superstructures (flower, pompom, hairy leave and petal shapes) using different solvents or by the incorporation of different co-monomers. The PACN particles were found to be formed through a continuous polymerization, self-assembly and growth process. Hansen solubility parameter analysis suggested that the hydrogen bonding interaction parameter played a key role for the polymer self-assembly into different structures. Solvents were accurately picked for preparing particles with desired shapes using Hansen solubility parameters. These uniform PACN particles can be readily converted to carbon flowers with tunable porous structures via different gas treatment conditions. They also exhibited high nitrogen loading. The novel properties of these carbon flower materials: high uniformity with relatively small particle size around 800 nm, unique flower-shaped open structures and other shapes with extended petals, hierarchical and tunable porous structure with great accessibility, high N concentration, and high electrical conductivity, high packing density make them useful for various energy, environmental or electronic applications, which include but not limited to, elelctrocatalysis; thermal catalysis; supercapacitors; various types of batteries; water treatment and purification; gas adsorption and storage; as additives or fillers for rubbers, conductive composites, pressure sensors, temperature sensors and etc; as support for various energy, environment, and electronic applications. This facile method provides an effective solution to the challenge in the synthesis of carbon with controllable morphology.

Turning now to the synthesis of PACN superstructures, in a typical process to synthesis PACN flowers (PACN-F), acrylonitrile (5 mL) and azobisisobutyronitrile (5 mg) were added into acetone solvent (5 mL). The reaction was held at 70° C. using an oil bath for 2 h in a sealed glass vial under $N_2$ protection without stirring. For the synthesis of PACN pompom structures, 4.75 mL acrylonitrile and 0.25 mL styrene were added together into 5 mL acetone solvent. Note: since internal pressure can build up rapidly during the polymerization process, pre-cautions need to be taken to ensure the reaction vial is properly sealed and a protecting shield is placed around the reaction vial. The resultant white powder was dried using vacuum oven at room temperature overnight to remove unreacted monomer and solvent. To explore the effects of solvents, dimethylformamide, isopropyl alcohol, hexane, toluene, ethanol, methanol and acetic acid, pyridine, tetrahydrofuran and acetonitrile were used. The same procedures were followed as described above for acetone, except replacing acetone with the desired solvents. To study the effect of co-monomers (styrene, acrylic acid or methyl methacrylate), acrylonitrile (4.75 mL), co-monomer (0.25 mL) and azobisisobutyronitrile (5 mg) were added into acetone solvent (5 mL). Then the same procedure followed as the case of PACN flowers.

To convert PACN superstructures to carbon superstructures, the dried PACN powder was first stabilized in air at 230° C. for 2 h at a ramping rate of 0.1° C./min. To explore the effect of ramping rate on the stability of the structures, ramping rates of 1° C./min and 5° C./min were also attempted. Then these stabilized materials were carbonized in $N_2$ (70 sccm) with a ramping rate of 5° C./min and held at 800° C., 900° C. and 1000° C. for 2 h in a tube furnace. For gas treatment to improve the porosity of these carbon flowers, PACN-F-600C was first prepared, and then was treated in a pure $CO_2$ or $NH_3$ flowing environment (50 sccm) at 900° C. for 1-3 hours.

TEM imaging was carried out using a spherical aberration (image) corrected FEI by Titan operated at 80 kV. Elemental composition was measured with XPS (PHI 5000 Versaprobe, Al Kα source). Nitrogen sorption experiments were performed using an Autosorb $iQ_2$ (Quantachrome) low-pressure gas sorption analyzer with 99.999% $N_2$ at 77 K. Pore size distributions (PSD) were obtained using quenched solid-state density functional theory (QSDFT) calculations with carbon model of slit, spherical and cylindrical pores. Surface area measurements were obtained by the BET method within the pressure range of $P/P_o$=0.05-0.25. Gel permeation chromatography (GPC) was carried out in DMF on divinylbenzene columns utilizing a Malvern Viscotek™ TDA 305 triple detection system. Samples were filtered over 0.2 μm PTFE filters before injection using a 1.0 mL/min flow rate. Molecular weights and polydispersities were determined by using gel permeation chromatography (GPC) by comparing monodispersed polyethylene glycol (PEG) standards using DMF as eluent. $^1$H NMR spectrum was recorded on a Varian Mercury 400 NMR spectrometer at room temperature with use of the deuterated solvent as the lock and the residual solvent or TMS as the internal reference. The measurement of electronic conductivity of the carbon flowers was done first by pressing the powders into pellets of 0.5 inch in diameter using 20 MPa pressure and then four-electrode measurement using deposited Au electrode of these pellets was conducted. All measurements were carried out using homemade measurement routines and data analysis was done with MATLAB.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the use of this invention for any but not limited to environment, energy and electronic applications.

All such variations are considered to be within the scope and spirit of the present invention as defined by the following claims and their legal equivalents.

What is claimed:

1. A method of fabricating a polyacrylonitrile (PACN) and deriving a nanostructured superstructure shape, comprising:
   a) synthesizing in a one-pot free radical polymerization synthesis a PACN structure using acrylonitrile (ACN) as a monomer, azobisisobutyronitrile (AIBN) as an initiator and an organic solvent; and
   b) converting the PACN structure into a nanostructured superstructure shape by stabilizing and carbonizing the PACN structure, wherein the stabilizing step comprises an oxidative reaction step in air at a temperature in a range of 180° C. to 300° C. with a ramping rate of 0.1° C./min to 5° C./min in a range of 2 to 12 hours and the carbonizing step comprises pyrolyzing the stabilized PACN structure at a temperature ranging from 600° C. to 1500° C. in an inert gas atmosphere or vacuum condition.

2. The method according to claim 1, wherein the organic solvent is selected from the group consisting of acetone, methanol, ethanol, acetic acid, acetonitrile, pyridine, THF, toluene, isopropanol, and hexane.

3. The method according to claim 1, wherein the step of synthesizing further comprising incorporating a co-monomer selected from the group consisting of acrylic acid (AA), styrene (S), methyl methacrylate (MMA), and other free radical polymerization monomers.

4. The method according to claim 1, wherein the nanostructured superstructure shape is selected from the group consisting of a flower-shape, a pompom-shape, a tree leaf-shape, and a petal-shape.

* * * * *

UNITED STATES PATENT AND TRADEMARK OFFICE
CERTIFICATE OF CORRECTION

| | |
|---|---|
| PATENT NO. | : 11,702,339 B2 |
| APPLICATION NO. | : 17/257727 |
| DATED | : July 18, 2023 |
| INVENTOR(S) | : Zhenan Bao et al. |

It is certified that error appears in the above-identified patent and that said Letters Patent is hereby corrected as shown below:

In the Specification

Column 1, Line 5 Please add:
GOVERNMENT SPONSORSHIP
This invention was made with Government support under contract DE-SC0008685 awarded by the Department of Energy. The Government has certain rights in the invention.

Signed and Sealed this
Twenty-first Day of May, 2024

Katherine Kelly Vidal
*Director of the United States Patent and Trademark Office*